(No Model.) 3 Sheets—Sheet 1.

M. F. BONZANO.
DEVICE FOR ARRESTING LOCOMOTIVES AND CARS.

No. 315,705. Patented Apr. 14, 1885.

Witnesses:
Alex Barkoff
Harry Smith

Inventor,
M. F. Bonzano
by his Attorneys
Howson & Sons (No Model.)
3 Sheets—Sheet 2.
M. F. BONZANO.
DEVICE FOR ARRESTING LOCOMOTIVES AND CARS.
No. 315,705. Patented Apr. 14, 1885.
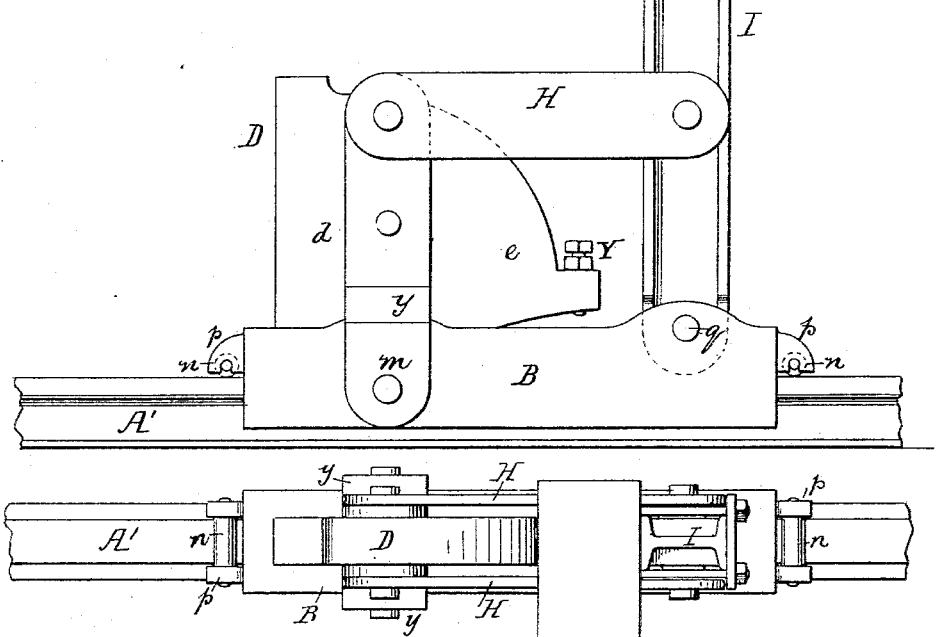

(No Model.) 3 Sheets—Sheet 3.
M. F. BONZANO.
DEVICE FOR ARRESTING LOCOMOTIVES AND CARS.
No. 315,705. Patented Apr. 14, 1885.
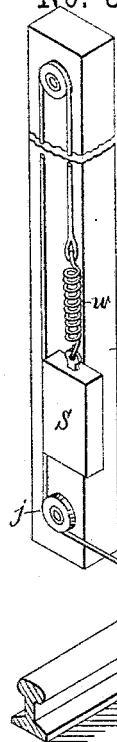
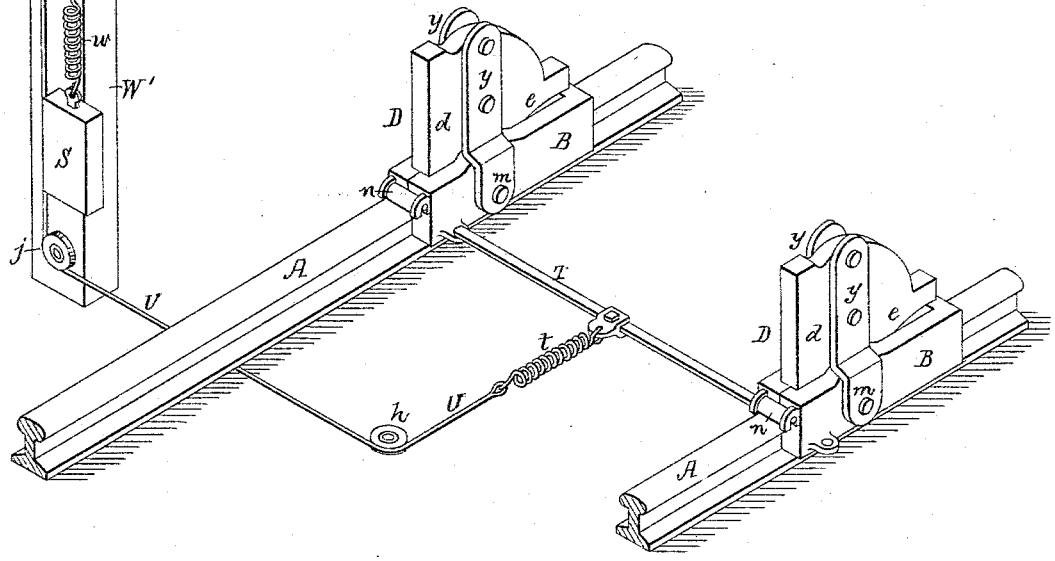
FIG. 7.
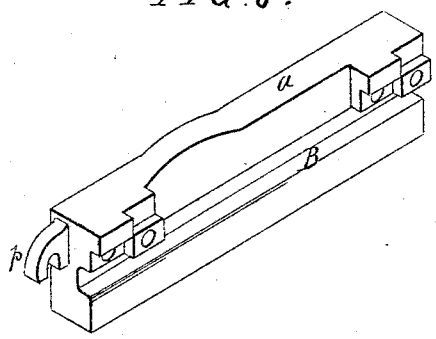
FIG. 8.
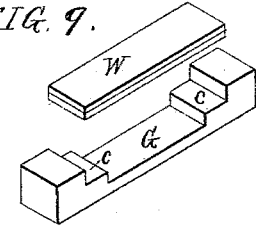
FIG. 9.
Witnesses:
Alex Barkoff
Harry Smith
Inventor
M. F. Bonzano
by his attorneys
Howson & Sons

UNITED STATES PATENT OFFICE.

MAXIMILIAN F. BONZANO, OF PHILADELPHIA, PENNSYLVANIA.

DEVICE FOR ARRESTING LOCOMOTIVES AND CARS.

SPECIFICATION forming part of Letters Patent No. 315,705, dated April 14, 1885.

Application filed September 12, 1884. (No model.)

*To all whom it may concern:*

Be it known that I, MAXIMILIAN F. BONZANO, a citizen of the United States, residing in Philadelphia, Pennsylvania, have invented certain Improvements in Devices for Arresting Locomotives and Cars, of which the following is a specification.

My invention consists of certain structural improvements in and attachments to the device for arresting locomotives and cars for which Letters Patent No. 293,846 were granted to me February 19, 1884, my improvements being fully described and claimed and their purport explained hereinafter.

Figure 1:
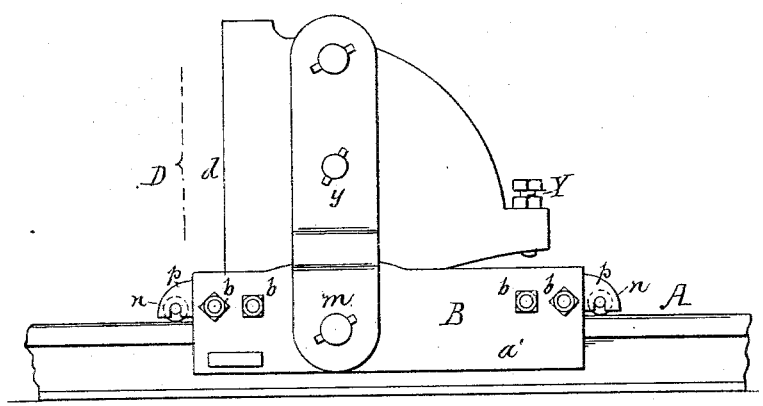
Figure 2:
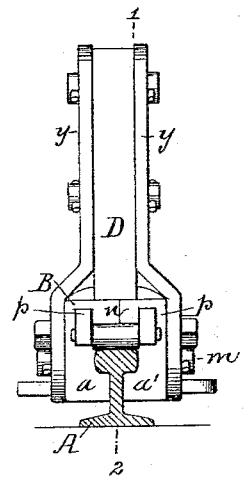
Figure 3:
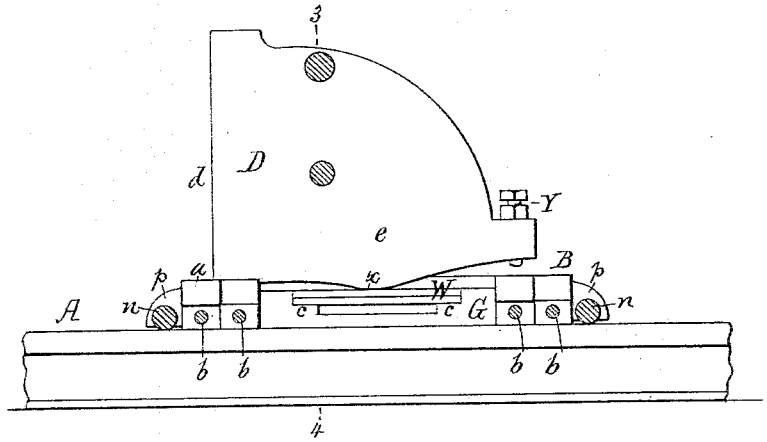
Figure 4:
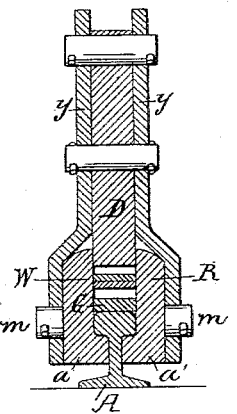

In the accompanying drawings, Figure 1, Sheet 1, is a side view of the arresting device made according to my improvements; Fig. 2, an edge view; Fig. 3, a section on the line 1 2, Fig. 2; Fig. 4, a section on the line 3 4, Fig. 3; Fig. 5, Sheet 2, a side view of my improved arresting device with attachment for the bumpers of a car to strike against; Fig. 6, a plan view of Fig. 5; Fig. 7, Sheet 3, a perspective view showing mechanism for restoring arresting devices to their normal positions; Figs. 8 and 9, perspective views of parts of the arresting device.

Referring in the first instance to Figs. 1, 2, 3, and 4, Sheet 1, and Figs. 8 and 9, Sheet 3, A is a part of one of the ordinary rails of a track; B, a shoe adapted to slide on the rail; D, a lever pivoted to the said shoe at $m$, the vertical arm $d$ of the lever being so arranged that the wheel or other part of a locomotive or car may strike against it, and the other arm, $e$, being arranged to bear at $x$ on a spring or springs, W, resting on a friction-plate, G, which is confined longitudinally and laterally to the shoe and must slide therewith, but is otherwise independent of the shoe and bears on the top of the rail A. A set-screw, Y, near the outer end of the arm $e$ of the lever, restricts the movement of the latter.

As described in the above general terms, the device is the same as that set forth in my aforesaid patent, taken in connection with the improvement described in an application for a patent filed by me May 26, 1884, Serial No. 132,698. The functions of the device, moreover, are the same as described in my said application; hence the following extract from the specification relating thereto may be introduced here: "If, when a locomotive or car comes into contact with the arm $d$ of the lever, the shock is a comparatively slight one, the spring may be sufficient to resist that shock before the lever is arrested by the contact of the screw Y with the shoe B, and the friction of the block on the rail, tending to retard the movement of the shoe and finally to arrest the locomotive or car, will be proportionate to the force exerted on the arm $d$ of the lever. Should the shock be a violent one, however, the spring will be compressed only so far as the screw will permit, and hence the friction will be restricted by the screw and cannot, if a proper spring is used, be so excessive as to arrest the locomotive or cars too abruptly."

While the device is similar to that referred to as regards its functional character, there is a structural difference between them, which I will proceed to explain: In the first place, the shoe B is composed of two longitudinal castings, $a$ $a'$, one being formed to fit snugly to one side and the other to the opposite side of the rail, and the two castings being bolted together at the point $b$. The character of these castings will be readily understood by reference to the perspective view, Fig. 8.

The lever D, instead of being one casting pivoted direct to the shoe, as in my said patent, consists of a casting combined with two bars, $y$ $y$, of wrought iron or steel, the bars being secured to the said casting and pivoted at $m$ to the shoe. In the top of the shoe is an opening for the friction-plate G, which is recessed to afford bearings $c$ $c$ for the flat spring or springs W, below which there is a space sufficient to permit the springs to yield.

The above-described improvements have been designed, mainly, to facilitate the application of the device to a rail.

The shoe, instead of bearing directly on the rail is supported by small rollers $n$ $n$, one at each end, the journals of the rollers having their bearings in lugs $p$, projecting from the said shoe. These rollers render the retraction of the device to its normal position a comparatively easy matter.

In Figs. 5 and 6, Sheet 2, there are two of the above-described devices, one applied to the rail A and the other to the rail A' of the track, and the lever D of each device is connected by a link, H, to a substantial bar, I, the lower end of which is pivoted to the shoe at $q$, and the bars I of the two devices are connected together by a transverse beam, J, which is at such an altitude above the track as to be opposite the bumpers of a car, so that when the latter strike the beam the two devices will slide on the rail, but will be accompanied with such friction that they will be arrested before the devices have been moved far on the rails.

In Fig. 7 the shoes of the two arresting devices are connected together by a cross-bar, T, to which is attached a rope or chain, U, the latter passing round a guide-pulley, $h$, on the track between the rails; thence round a pulley, $j$, on the lower end of a post or frame, W', erected near the track; thence over a pulley near the upper end of the post, and thence to a weight, S, which is sufficient to retract the arresting devices after they have performed their duty, and after the car or locomotive which they have arrested has receded from them.

The shock on the arresting devices is so sudden that it is advisable to make the connection between them and the weight of slightly yielding character; hence, I prefer to interpose a spiral spring, $t$, between the end of the rope or chain U and the cross-bar T, and, as a further precaution against the injurious effects of sudden shocks, the weight S may be suspended to the rope or chain by a spiral spring, $w$.

I claim as my invention—

1. The combination of the shoe B, made in two parts secured together, and the lever D, pivoted to the shoe with a friction-plate, G, a spring or springs interposed between the lever and shoe, and a device for restricting the movement of the lever, substantially as set forth.

2. The combination of the shoe, its friction-plate and spring, with the lever composed of a casting and two bars, $y\,y$, of wrought-iron or steel secured to the said casting and pivoted to the shoe, substantially as specified.

3. The combination of the shoe and its rollers $n\,n$ and the friction-plate and spring with the lever D, pivoted to the said plate, substantially as described.

4. The combination of the two-part shoe B, the friction-plate G, and springs W, with the lever having bars $y\,y$, pivoted to the shoe, and a device for restricting the movement of the lever, substantially as set forth.

5. The combination of two arresting devices, one adapted to one rail and the other to the other rail of a track, and each device composed of a shoe, a lever pivoted thereto, a friction-plate, and a spring or springs with the bumper-beam J and bars I, pivoted to the shoes, and connected to the levers of the said arresting devices, substantially as specified.

6. The combination of the within-described arresting devices, one adapted to one rail and the other to the other rail of a track, a cross-bar connecting the shoes of the two devices together, a weighted rope or chain, part or parts of which being made elastic, and guide-pulleys for the said rope or chain, substantially as described.

In testimony whereof I have signed my name to this specification in the presence of two subscribing witnesses.

MAXIMILIAN F. BONZANO.

Witnesses:
JOHN M. CLAYTON,
HENRY HOWSON, Jr.